United States Patent
Jain et al.

(10) Patent No.: US 11,057,266 B2
(45) Date of Patent: *Jul. 6, 2021

(54) IDENTIFYING TROUBLESHOOTING OPTIONS FOR RESOLVING NETWORK FAILURES

(71) Applicant: Microsoft Technology Licensing, LLC, Redmond, WA (US)

(72) Inventors: Navendu Jain, Seattle, WA (US); Rahul Potharaju, West Lafayette, IN (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 119 days.

This patent is subject to a terminal disclaimer.

(21) Appl. No.: 16/357,202

(22) Filed: Mar. 18, 2019

(65) Prior Publication Data

US 2019/0215236 A1 Jul. 11, 2019

Related U.S. Application Data

(63) Continuation of application No. 14/223,995, filed on Mar. 24, 2014, now Pat. No. 10,263,836.

(51) Int. Cl.
*H04L 12/24* (2006.01)
*G06F 11/07* (2006.01)

(52) U.S. Cl.
CPC ........ *H04L 41/0686* (2013.01); *G06F 11/079* (2013.01); *H04L 41/0654* (2013.01);
(Continued)

(58) Field of Classification Search
CPC . H04L 41/0686; H04L 41/16; H04L 41/0672; H04L 41/0654; H04L 41/0886; H04L 41/069; G06F 11/079
(Continued)

(56) References Cited

U.S. PATENT DOCUMENTS 5,881,048 A * 3/1999 Croslin ............... H04Q 3/0079
370/228
8,041,663 B2 10/2011 Beaty et al.
(Continued)

FOREIGN PATENT DOCUMENTS

CA 2854339 A1 5/2013
CN 1835449 A 9/2006
(Continued)

OTHER PUBLICATIONS

Wikipedia "Data center" page from date Dec. 29, 2013, retrieved using the way back machine, from https://web.archive.org/web/20131229120229/https://en.wikipedia.org/wiki/Data_center (Year: 2013).*

(Continued)

*Primary Examiner* — Yair Leibovich
(74) *Attorney, Agent, or Firm* — Medley, Behrens & Lewis

(57) ABSTRACT

Described herein are various technologies pertaining to providing assistance to an operator in a data center with respect to failures in the data center. An alarm is received, and a failing device is identified based upon content of the alarm. Failure conditions of the alarm are mapped to a failure symptom that may be exhibited by the failing device, and troubleshooting options previously employed to mitigate the failure symptom are retrieved from historical data. Labels are respectively assigned to the troubleshooting options, where a label is indicative of a probability that a troubleshooting option to which the label has been assigned will mitigate the failure symptom.

20 Claims, 11 Drawing Sheets

(52) U.S. Cl.
CPC .......... *H04L 41/0672* (2013.01); *H04L 41/16* (2013.01); *H04L 41/069* (2013.01); *H04L 41/0886* (2013.01)

(58) Field of Classification Search
USPC ......................................................... 714/57
See application file for complete search history.

(56) References Cited

U.S. PATENT DOCUMENTS

| | | | |
|---|---|---|---|
| 8,332,690 | B1 | 12/2012 | Banerjee et al. |
| 10,263,836 | B2* | 4/2019 | Jain .................... H04L 41/0672 |
| 2005/0216421 | A1* | 9/2005 | Barry .................... G06F 16/972 |
| | | | 705/64 |
| 2008/0181100 | A1* | 7/2008 | Yang .................. H04L 41/0654 |
| | | | 370/216 |
| 2011/0191630 | A1 | 8/2011 | Li et al. |
| 2012/0066541 | A1 | 3/2012 | Dournov et al. |
| 2013/0232382 | A1 | 9/2013 | Jain et al. |
| 2013/0250779 | A1 | 9/2013 | Meloche et al. |
| 2015/0271008 | A1 | 9/2015 | Jain et al. |

FOREIGN PATENT DOCUMENTS

| | | |
|---|---|---|
| CN | 101218786 A | 7/2008 |
| CN | 102055604 A | 5/2011 |
| EP | 1031208 B1 | 9/2005 |
| GB | 2500740 A | 10/2013 |
| JP | H08288944 A | 11/1996 |
| JP | 2006085538 A | 3/2006 |
| RU | 2103744 C1 | 1/1998 |
| RU | 2304849 C2 | 8/2007 |
| RU | 2463718 C2 | 10/2012 |

OTHER PUBLICATIONS

Wu, et al., "NetPilot: Automating Datacenter Network Failure Mitigation", In Proceedings of ACM SIGCOMM Conference Aug. 13, 2012, 12 pages.

"Brocade Network Advisor Features Brief for Data Center Networks", Published on: Dec. 8, 2010, Retrieved at: <<http://www.brocade.com/downloads/documents/technical_briefs/brocade-network-advisor-data-center-fb.pdf>>, 73 pages.

"Office Action for U.S. Appl. No. 14/223,995", dated Oct. 7, 2015, 45 pages.

"Response to Office Action for U.S. Appl. No. 14/223,995", filed Apr. 6, 2016, 14 pages.

"Office Action for U.S. Appl. No. 14/223,995", dated Jun. 22, 2016, 33 pages.

"Response to Office Action for U.S. Appl. No. 14/223,995", filed Nov. 22, 2016, 13 pages.

"Final Office Action for U.S. Appl. No. 14/223,995", dated Mar. 23, 2017, 41 pages.

"Response to Final Office Action for U.S. Appl. No. 14/223,995", filed Aug. 23, 2017, 9 pages.

"Office Action for U.S. Appl. No. 14/223,995", dated Sep. 26, 2017, 38 pages.

"Response to Office Action for U.S. Appl. No. 14/223,995", filed Mar. 25, 2018, 10 pages.

"Final Office Action for U.S. Appl. No. 14/223,995", dated Jul. 12, 2018, 25 pages.

"Response to Final Office Action for U.S. Appl. No. 14/223,995", filed Oct. 12, 2018, 10 pages.

"Notice of Allowance and Fees Due for U.S. Appl. No. 14/223,995", dated Nov. 23, 2018, 34 pages.

"Office Action Issued in Indian Patent Application No. 201647030449", dated May 27, 2020, 5 Pages.

"Second Office Action Issued in Chinese Patent Application No. 201580015257.7", dated May 17, 2019, 8 Pages.

"Office Action Issued in Japanese Patent Application No. 2016-558574", dated Dec. 3, 2019, 7 Pages.

"Office Action Issued in Japanese Patent Application No. 2016-558574", dated Mar. 19, 2019, 15 Pages.

"Office Action Issued in Chinese Patent Application No. 201580015257.7", dated Dec. 5, 2018, 12 Pages.

"Office Action Issued in Russian Patent Application No. 2016137896", dated Sep. 19, 2018, 11 Pages.

"Office Action Issued in Brazil Patent Application No. BR112016020189-2", dated Sep. 4, 2020, 5 Pages.

* cited by examiner

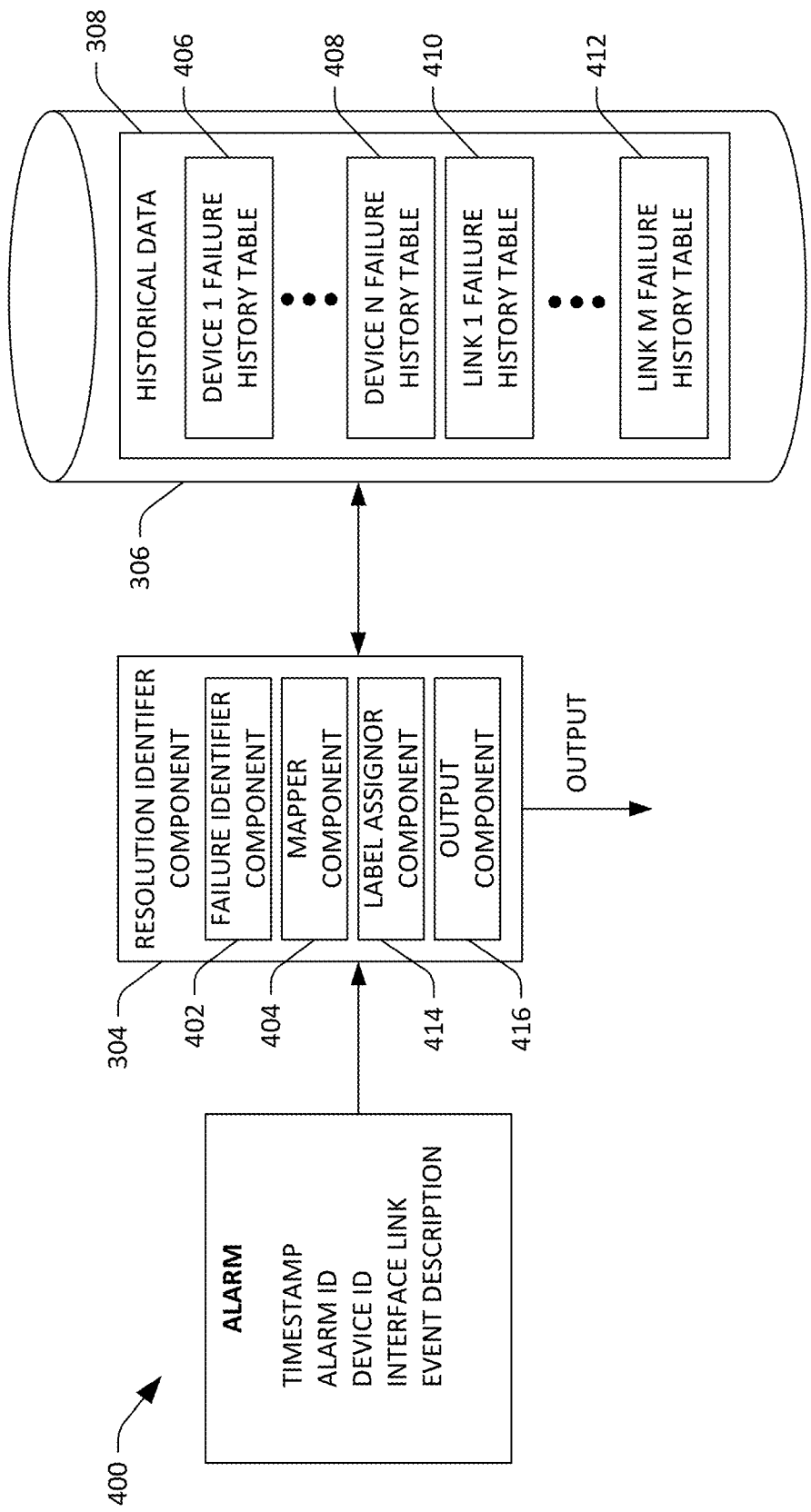

| DEVICE FAILURE HISTORY TABLE | |
|---|---|
| DEVICE ID | ID Z |
| DEVICE MANUFACTURER | MANUFACTURER Y |
| DEVICE TYPE | TYPE X |
| DEVICE MODEL | MODEL W |
| DEVICE PLATFORM | PLATFORM V |
| DEVICE AVAILABILITY | TIME RANGES |
| CURRENT TRAFFIC | TRAFFIC |
| CURRENT CPU | CPU |
| CURRENT MEMORY | MEMORY |
| HISTORIC CPU | T1, CPU1; T2, CPU2, ... |
| HISTORIC MEMORY | T1, MEM1; T2, MEM2, ... |
| DEVICE CONNECTIONS | U |
| CONFIGURATION CHANGES | CHANGE 1, CHANGE 1 DESCRIPTION; CHANGE 2, CHANGE 2 DESCRIPTION, ... |
| FAILURE SYMPTOMS (FS) | FS1, FS2, ... |
| FS1 | TROUBLESHOOTING (TS) OPTION 1, TS2, ... |
| ⋮ | ⋮ |
| TS1 | DEBUGGING STEP (DS) 1, DS2, ... |
| ⋮ | ⋮ |
| HARDWARE (HW) CHANGES | HW CHANGE 1, HW CHANGE 2, ... |
| SOFTWARE (SW) CHANGES | SW CHANGE 1, SW CHANGE 2, ... |
| ENGINEER/OPERATOR IDENTITIES | ID 1, ID 2, ... |
| NO. OF OUT-OF-WARRANTY REPLACEMENTS | Q |

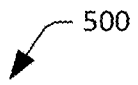

IDENTIFYING TROUBLESHOOTING OPTIONS FOR RESOLVING NETWORK FAILURES

CROSS REFERENCE TO RELATED APPLICATION

This application is a continuation of U.S. patent application Ser. No. 14/223,995 filed on Mar. 24, 2014, and entitled "IDENTIFYING TROUBLESHOOTING OPTIONS FOR RESOLVING NETWORK FAILURES", the entirety of which is incorporated herein by reference.

BACKGROUND

A data center is a collection of computing devices that communicate with one another over a network and operate in conjunction to provide computing services and/or data storage services to one or more end users, where an end user can be an individual, an enterprise, or the like. The data center therefore includes numerous computing devices, numerous network infrastructure devices, such as routers, re-routers, switches, gateways, firewalls, virtual private networks (VPNs), bridges, etc., communications links between computing devices and network infrastructure devices, and communications links between network infrastructure devices. When providing the aforementioned services, data is transmitted through the network and between computing devices in the data center. The network infrastructure devices are configured to direct traffic through the network.

In conventional data centers, the network infrastructure devices include high-end devices, which tend to be relatively expensive. Recently, however, data centers have been configured to include numerous commodity (e.g., off-the-shelf) network infrastructure devices to decrease capital costs associated with the data center. While these commodity devices cost less than the "high-end" devices, commodity devices tend to be somewhat less reliable than the high-end devices, resulting in an increased burden on data center operators to ensure uninterrupted service. Resolving network failures, however, can be complex and thus time-consuming, as network infrastructure devices in a data center can be manufactured by numerous different manufacturers, as computing and/or network devices in the data center may have different operating systems installed thereon, as a manufacturer may generate different models of the same type of device, etc. Thus, there is a significant amount of heterogeneity in conventional data centers.

In relatively large data centers, an operations team is employed to ensure that the computing services and storage services promised to end users (e.g., in Service Level Agreements) are being met. Accordingly, when a network device (e.g., a computing device or a network infrastructure device) generates an alarm, the alarm is directed towards an operator console monitored by an operator on the operations team. The operator reviews the alarm and, based upon personal knowledge and experience (and possibly some static guidelines), the operator performs troubleshooting and debugging to try to either only mitigate (rather than diagnose) or fix the failure (by diagnosing the problem root cause) indicated by the alarm. While this approach may be suitable for relatively small data centers, such approach does not scale. For example, data centers are scaling to include hundreds of thousands of computing devices and several thousand network infrastructure devices. When particular events occur, a large number of alarms can be generated by devices in the data center in a relatively short amount of time. The operator must parse through the alarms to prioritize which alarms are to be initially addressed, and then typically uses a trial-and-error approach (potentially driven by pre-defined human-generated guidelines) to address alarms believed to be high priority. Due to the relatively high complexity of potential network problems, the operator may require a prolonged troubleshooting time window, which may result in service downtime.

SUMMARY

The following is a brief summary of subject matter that is described in greater detail herein. This summary is not intended to be limiting as to the scope of the claims.

Described herein are various technologies pertaining to identifying potential troubleshooting options and resolution steps that can be employed to resolve a network failure in a data center. The troubleshooting options and resolutions steps are provided to an operator, who can consume the troubleshooting options and resolutions steps and resolve the network failure using the provided troubleshooting options and resolutions steps. Additionally described herein are various technologies pertaining to prioritizing network failures based upon alarms generated by devices in a data center, wherein a prioritized list can be surfaced to the operator to facilitate triaging alarms.

A data center includes a plurality of networked computing devices, wherein data can be transmitted between the computing devices over network links by way of a plurality of network infrastructure devices, such as routers, co-routers, switches, load balancers, firewalls, virtual private networks (VPNs), amongst others. The computing devices and/or network infrastructure devices (collectively referred to as "devices") can be configured to generate alarms that are indicative of network failures. For example, a switch can be configured to generate an alarm when the switch detects that a link between the switch and another device is down. The alarm is received, and a determination is made as to whether the alarm is indicative of an actionable network event (e.g., a network failure that is to be resolved). When it is determined that the alarm is indicative of a resolvable network failure, the failure conditions and associated telemetry data can be mapped to a set of observed symptoms experienced on: 1) the failing device or link; 2) the platform of the failing device; 3) devices neighboring the failing device in the network topography; 4) devices sharing a property with the failing device; and/or 5) devices in the same data center as the failing device, among other aspects. Accordingly, at least one symptom (e.g., "device down", "link flapping", "high CPU utilization", . . . ) can be identified for the failing device or link.

Responsive to identifying the symptom for the failing device or link, a plurality of recommended troubleshooting options that may potentially resolve the network failure can be identified. The troubleshooting options can be based upon previous troubleshooting options observed in the past to resolve the network failure pertaining to the failing device or link, the failing device type, the failing device platform, etc. The troubleshooting options can have respective labels assigned thereto, wherein the labels are indicative of respective probabilities that the troubleshooting options, when taken by the operator, will resolve the network failure indicated by the alarm. The labels can be identified based upon past successes or failures of the troubleshooting options when undertaken with respect to the failing device or link, the failing device type, the failing device platform, etc. Accordingly, the operator can be provided with a list of troubleshooting options to resolve the network failure, as well as labels respectively assigned to the troubleshooting options that are indicative of respective probabilities that the troubleshooting options will resolve the network failure. Further, the operator can employ domain knowledge (e.g., from experience or knowledge provided by a domain expert) in combination with the probabilities of the troubleshooting option to determine the sequence of actions to perform to resolve the failure.

In addition, for a troubleshooting option in the list of troubleshooting options, a plurality of debugging steps can be presented to the operator, wherein the debugging steps can be assigned labels that are respectively indicative of probabilities that the debugging steps will correct the network failure. In a non-limiting example, a network infrastructure device can output an alarm that indicates that a downstream network infrastructure device is not replying to heartbeat requests. The alarm can be received, and the failure conditions in the alarm can be mapped to the previously observed symptom "device down." For such symptom, three troubleshooting options, ranked by their respective probabilities of resolving the failure, can be presented to the operator: 1) "check cable", 2) "check power supply", and 3) "check network card". Labels assigned to the troubleshooting options can indicate that the first troubleshooting option is most likely to resolve the network failure, the second troubleshooting option is second most likely to resolve the network failure, and the third troubleshooting option is third most likely to resolve the network failure. Further, for a troubleshooting option in the list of troubleshooting options, at least one debugging step can be provided to the operator. For example, for the troubleshooting option "check cable", two potential debugging steps can be presented to the operator. Each debugging step can be assigned a respective label that is indicative of a probability that the debugging step will resolve the network failure. For instance, debugging steps of "reseat the cable" and "clean the cable" can be presented as debugging steps, with the first debugging step indicated as being more likely to correct the network failure than the second debugging step. The indication of likelihood can be a function of probabilities computed based upon observed debugging steps previously undertaken by data center operators on the failing device or link or device(s) related to the failing device or link.

A data-driven approach can be used to identify the troubleshooting options and debugging steps, and to assign respective labels to troubleshooting options and debugging steps. For example, when the operator resolves the network failure by way of a troubleshooting option and corresponding debugging step, the operator can provide feedback that indicates if the symptom was correctly identified, can identify which troubleshooting option was selected, and can identify which debugging steps were used to resolve the network failure. Accordingly, when a different alarm is subsequently received (pertaining to the failing device or link, the type of the failing device, the platform of the failing device, etc.), the failure conditions can be appropriately mapped to a symptom, and labels assigned to troubleshooting options and debugging steps, respectively, can be updated based upon this feedback. Thus, over time, accuracy of the troubleshooting options and debugging steps can increase.

Additionally, as will be described herein, alarms can be grouped to represent a singular network failure, and network failures can be prioritized. That is, instead of treating low-level network alarms in isolation, alarms can be correlated (grouped) with one another to represent a singular network failure. Pursuant to an example, this grouping can be based upon three criteria: 1) time; a first alarm generated by a first device can be grouped with a second alarm generated recently in time by the first device or a second device on the same interface; 2) location; the first alarm can be grouped with a second alarm generated by a second device that is a neighbor of the first device in the network (e.g., 1-2 hops upstream or downstream in the hierarchical network topography); and 3) redundancy group; the first alarm can be grouped with a second alarm generated by a second device in a same redundancy group as the first device (e.g., which can indicate a problem with a failover protocol). Grouping of alarms to represent network failures can be employed to categorize and rank current network failures, such that network failures that may result in high business impact can be prioritized higher than network failures that result in low business impact.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 4 is a functional block diagram of an exemplary resolution identifier component included in the resolution system.

FIG. 5 is an exemplary failure history table.

DETAILED DESCRIPTION

Figure 1:
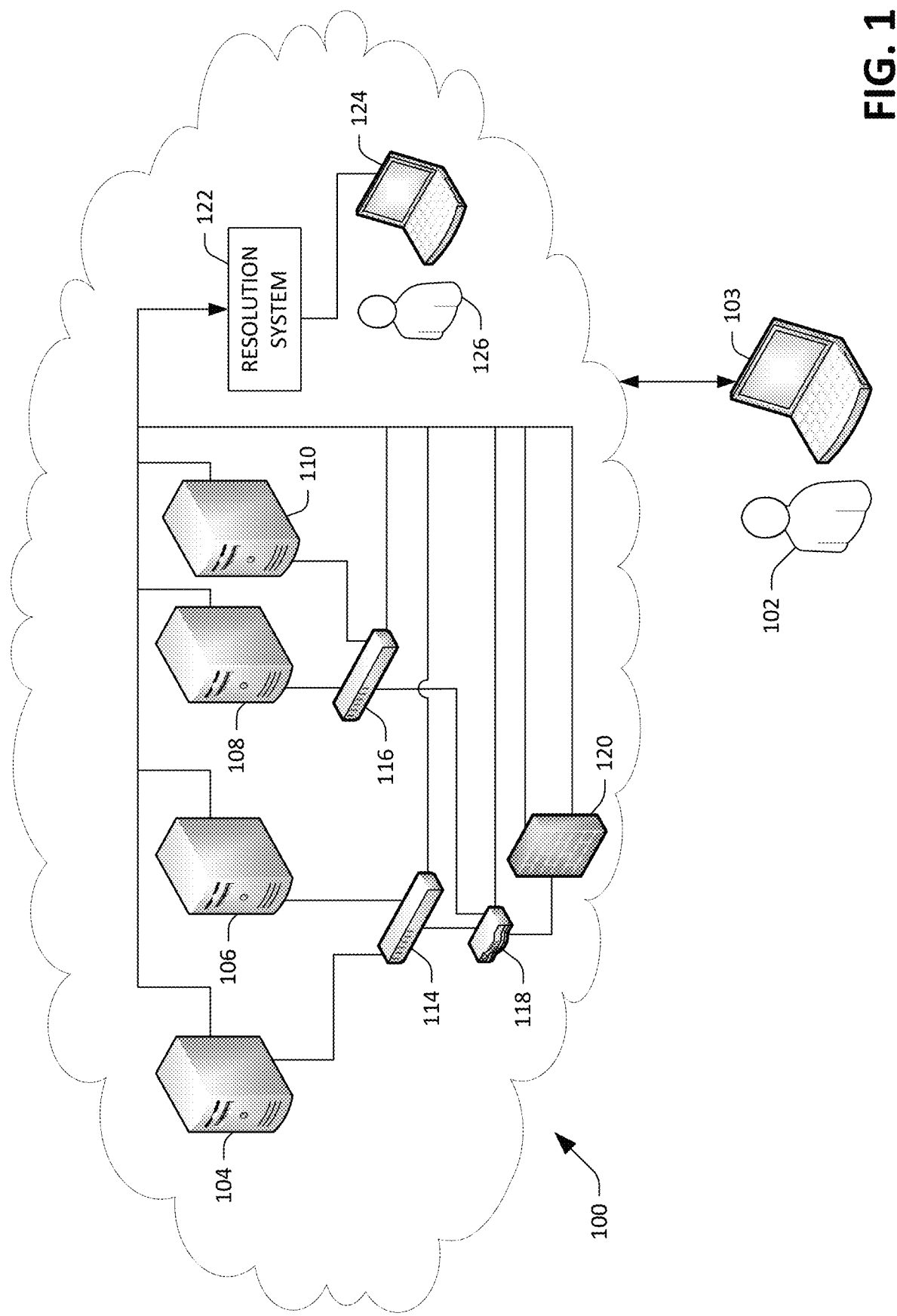
FIG. 1 illustrates an exemplary portion of a data center.

Various technologies pertaining to resolving network failures in a data center are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, a portion of an exemplary data center 100 (referred to herein as the data center 100) is illustrated. The data center 100 can be configured to provide services to an end user 102, wherein such services can be compute services and/or storage services, and wherein the end user 102 can be an individual, an enterprise, or the like. In an example, the data center 100 may be an enterprise data center that is owned by a particular enterprise and provides compute and storage services for the enterprise. In such a situation, the end user 102 can be an individual who works in the enterprise, a division of the enterprise, etc. In another example, the data center 100 may be operated by a first company, and the end user 102 may be a second company (e.g., the first company leases data storage and computing resources to the second company). In yet another example, the data center 100 may be operated by a company, and the end user 102 may be an individual. Exemplary computing services and/or storage services that can be offered by the data center 100 included email services, search services, storage, online services, and the like. In an example, the end user 102 can operate a computing device 103 and can transmit data to and receive data from the data center 100 by way of the computing device 103, wherein the computing device 103 can be any suitable type of computing device, including but not limited to a desktop computing device, a mobile computing device (e.g., a laptop computing device, a mobile telephone, a slate computing device, a wearable computing device, etc), a server, or the like.

The data center 100 includes a plurality of computing devices 104-110, wherein the computing devices 104-110 may include servers, dedicated storage devices, etc. The computing devices 104-110 are configured to perform actions (e.g., store data, process data, and/or transmit data) based upon a request from the computing device 103 of the end user 102. For example, the end user 102 may request performance of a search over content in storage of the first computing device 104, and the first computing device 104 can be configured to execute the search and output search results responsive to the data center 100 receiving the request. In another example, the second computing device 106 can store a portion of a search engine index, and can be configured to transmit the portion of the search engine index to another computing device in the data center 100 (or to another data center) responsive to receipt of a request to do so from the computing device 103.

The data center 100 further comprises a plurality of network infrastructure devices 114-120. The network infrastructure devices 114-120 are configured to facilitate transmission of data between computing devices in the computing devices 104-110 in the data center 100, facilitate transmission of data between data centers, as well as to facilitate transmission of data between the computing device 103 operated by the end user 102 and the computing devices 104-110. In the exemplary data center 100 depicted in FIG. 1, the network infrastructure devices 114-120 include two switches 114 and 116, a router 118, and a firewall 120. Devices in the data center 100 (where "devices" refer collectively to computing devices and network infrastructure devices) are communicatively coupled to one another by way of network links. Thus, for instance, the first computing device 104 is communicatively coupled with the switch 114 by way of a first network link, the second computing device 106 is communicatively coupled with the switch 114 by way of a second network link, the switch 114 is communicatively coupled to the router 118 by way of a third network link, and so on. It is to be understood that while the data center 100 is shown as including a relatively small number of devices, a data center can include many thousands of computing devices and many thousands of network infrastructure devices. Further, the network infrastructure devices 114-120 can include hardware and/or software-based devices. For example, the router 118 may be a software-based router that is executed by a computing device. Similarly, the firewall 120 may be a software firewall that executes in a hardware router or computing device.

The computing devices 104-HO and/or the network infrastructure devices 114-120 can be configured to output alarms when certain respective events are detected. In an example, the router 118 can be configured to output an alarm when the router 118 outputs heartbeat request (e.g., a request to reply to the message) directed towards a particular computing device and fails to receive one or more responses within a threshold amount of time from transmitting the heartbeat. In another example, a set of distributed processes running inside the data center 100 (referred to as "runners" or "watchdogs") or outside the data center 100 can periodically send a heartbeat request to a service, a server, or a computing device in addition to executing a set of synthetic microtransactions to ensure that the service, server or the computing device is available from an end-user perspective (e.g., send a small test mail to check that the mail service is running properly). An alarm can be generated when a response to the heartbeat request is not received. Accordingly, an alarm can be indicative of a network failure: e.g., that the computing device is down, or that a network link between the router 118 and the particular computing device is down. In another example, the switch 114 can be configured to generate an alarm when data volume directed through the switch 114 reaches a pre-defined threshold.

A resolution system 122 receives alarms generated by the computing devices 104-110 and/or the network infrastructure devices 114-120 and outputs data to an operator station 124 employed by a network operator 126 to assist the network operator 126 in resolving network failures indicated by at least one alarm. As will be described in greater detail herein, the resolution system 122 can identify a network failure based upon at least one received alarm, and can identify a plurality of potential troubleshooting options for resolving the network failure. A troubleshooting option can be perceived as a high-level check that can be performed by the operator, such as "check network card", "check cable", or the like. Further, the resolution system 122 can assign respective labels to the troubleshooting options, where the labels are respectively indicative of probabilities that the troubleshooting options will resolve the network failure when undertaken by the network operator 126. As will be described in greater detail herein, the resolution system 122 can identify the troubleshooting options and respective labels based upon previous troubleshooting options undertaken by the network operator 126 (or other operators in an operations team for the data center 100) to resolve similar network failures (e.g., network failures with similar symptoms).

The operator 126 is thus provided with a prioritized list of troubleshooting options that the operator 126 can step through to resolve the network failure. Furthermore, a troubleshooting option can have one or more debugging steps assigned thereto, wherein a debugging step provides more granular instructions (when compared to the troubleshooting option) to the operator 126 for resolving the network failure. In an example, when the operator 126 chooses a particular troubleshooting option, a list of debugging steps can be presented to the operator 126. Additionally, each debugging step can have a respective label assigned thereto, where the label is indicative of a probability that the debugging step will resolve the identified network failure (assuming that the troubleshooting option is the correct option). From the perspective of the operator 126, the operator 126 is provided with a list of troubleshooting options from which the operator 126 can select a particular troubleshooting option (e.g., the troubleshooting option associated with the highest probability of resolving the network failure), and can then perform debugging steps in order of probability. In addition, the operator 126 can further be provided with counts indicating a number of times that a troubleshooting option and/or debugging step was taken and/or a number of times that the troubleshooting option and/or debugging step was successful. For instance, two troubleshooting options can be assigned equivalent probabilities (e.g., 50%). However, a first label assigned to the first troubleshooting option can indicate that the troubleshooting option was taken twice and was successful once, while a second label assigned to the second troubleshooting option can indicate that the troubleshooting option was selected one thousand times and was successful five hundred times. When the operator 126 resolves the network failure, the operator 126 can provide feedback to the resolution system 122 as to which troubleshooting option (if any) and which debugging steps (if any) resolved the network failure. This feedback can be employed by the resolution system 122 when subsequent alarms are received, wherein troubleshooting options, debugging steps, and corresponding labels can be based upon the feedback. Thus, the resolution system 122 uses a data-driven approach to provide network failure resolution instructions to operators.

The resolution system 122 can further be configured to prioritize network failures for the operator 126, such that network failures are triaged. As will be understood by one skilled in the art, some network failures have greater impact on profit, data throughput, or the like, than other network failures. The resolution system 122 can be configured to receive an alarm from the computing devices 104-110 and/or the network infrastructure devices 114-120, and group the alarm with at least one other alarm to represent a singular network failure. Thus, instead of the operator 126 analyzing low-level independent alarms, the operator 126 can be provided with a higher-level representation of network failures. Further, the resolution system 122 can prioritize network failures relative to one another, such that the operator 126 is directed to troubleshoot network failures having highest impact first, followed by network failures having lower impact.

While the resolution system 122 is shown as being included in the data center 100, it is to be understood that the resolution system 122 may be executed on a computing device that is external to the data center 100. For example, the data center 100 may include a computing device that is configured to transmit all collected network alarms an external device that executes the resolution system 122. Furthermore, it is to be understood that the resolution system 122 can be executed on a computing device or distributed across multiple computing devices. In yet another example, the resolution system 122 may execute in a virtual machine (VM), wherein the VM is executed on a computing device or is distributed across multiple computing devices (internal or external to the data center 100).

Figure 2:
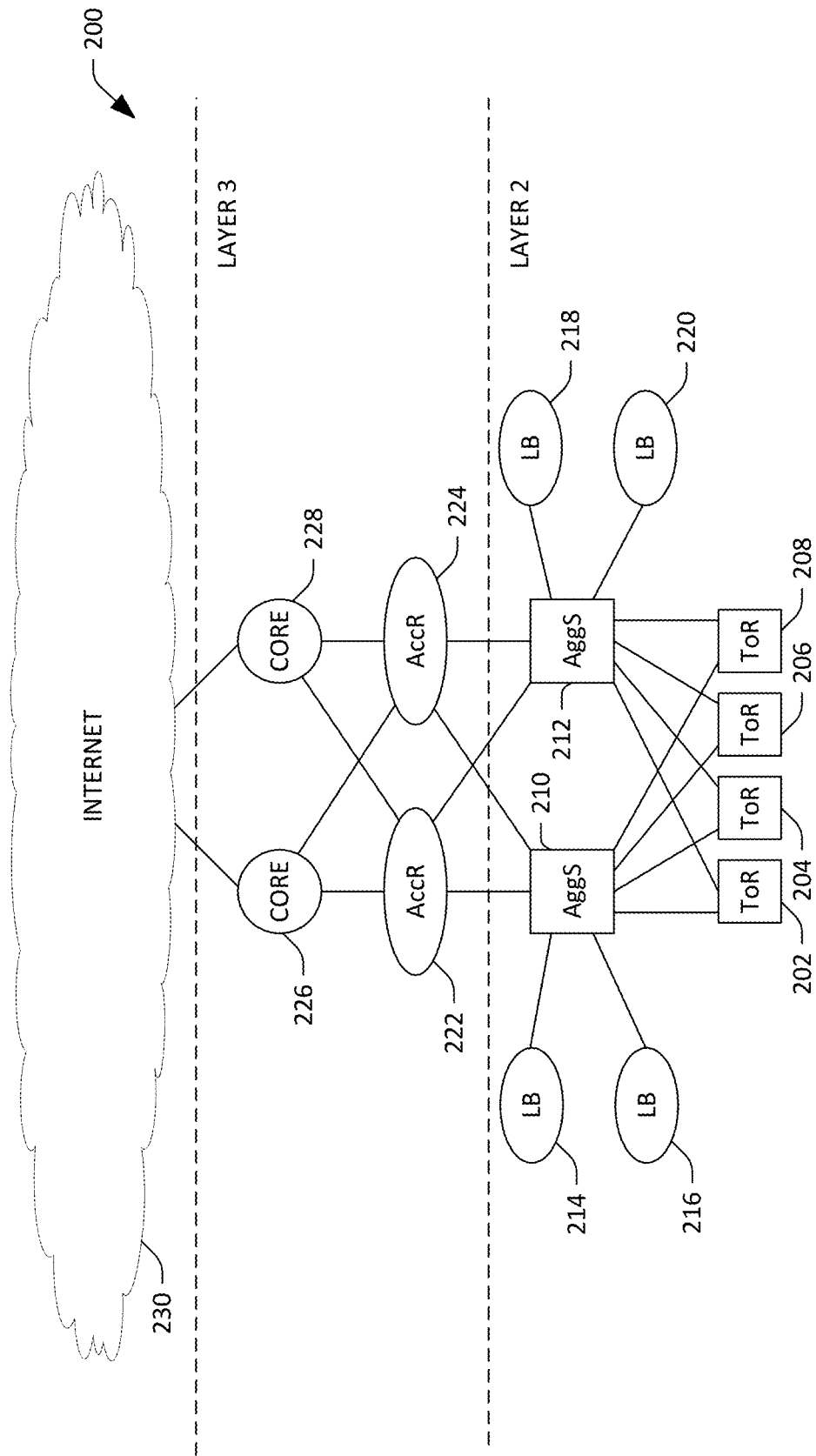
FIG. 2 illustrates an exemplary data center architecture.

With reference now to FIG. 2, an exemplary (partial) data center architecture 200 is illustrated, wherein the data center 100 can be included the data center architecture 200. It is to be understood that the data center architecture 200 is exemplary, and that other topology variants, such as flat networks/ Clos topologies, may include the data center 100 and are intended to be covered by the appended claims. The data center architecture 200 comprises a plurality of Top of Rack (ToR) switches 202-208. A respective plurality of rack-mounted servers (not shown) can be connected (or dual-homed) to each ToR switch in the ToR switches 202-208.

The architecture 200 also includes a primary aggregation switch 210 and a backup aggregation switch 212, wherein each ToR switch in the ToR switches 202-208 is connected to the primary aggregation switch 210 and the backup aggregation switch 212 (for redundancy). In practice, a data center includes several pairs of primary and backup aggregation switches, and each redundant pair of aggregation switches aggregates traffic from several (e.g., tens) of ToR switches. The architecture 200 may include a first redundant pair of load balancers 214-216 connected to the primary aggregation switch 210 and a second redundant pair of load balancers 218 and 220 connected to the backup aggregation switch 212. The load balancers 214-220 can perform mapping between static IP addresses (e.g., exposed to clients through DNS) and dynamic IP addresses of servers that process user requests.

The architecture 200 further includes a primary access router 222 and a backup access router 224. The primary aggregation switch 210, the backup aggregation switch 212, the primary access router 222, and the backup access router 224 can form a redundancy group. In a data center having the architecture 200, redundant groups of devices and links can be used to mask network failures. The aggregation switches 210-212 forward traffic (aggregated from the ToRs 202-208) to the access routers 222-224. The architecture 200 also includes a primary core router 226 and a backup core router 228, each of which are connected to both access routers 222-224. The primary access router 222, the backup access router 224, the primary core router 226, and the backup core router 228 form another redundancy group. The access routers 222-224 route, for example, aggregated traffic from up to several thousand servers and route the traffic to the core routers 226-228. The core routers 226-228 connect to the rest of the data center network and Internet 230.

In an exemplary embodiment, servers in the architecture (e.g., coupled to the ToR switches 202-208) can be partitioned into virtual local area networks (VLANs) to limit overhead and to isolate different applications hosted in the network. At each layer of the data center topology (with the possible exception of a subset of ToR switches, redundancy (e.g., 1:1 redundancy) can be built into the network topology to mitigate failures. Further, in addition to routers and switches, the architecture 200 can include middle boxes such as load balancers, firewalls, and the like. From the foregoing, it can be ascertained that the computing devices 104-110 can be server computing devices in the architecture, the switches 114-116 can be aggregation switches, the router 118 can be an access router or a core router, etc.

Figure 3:
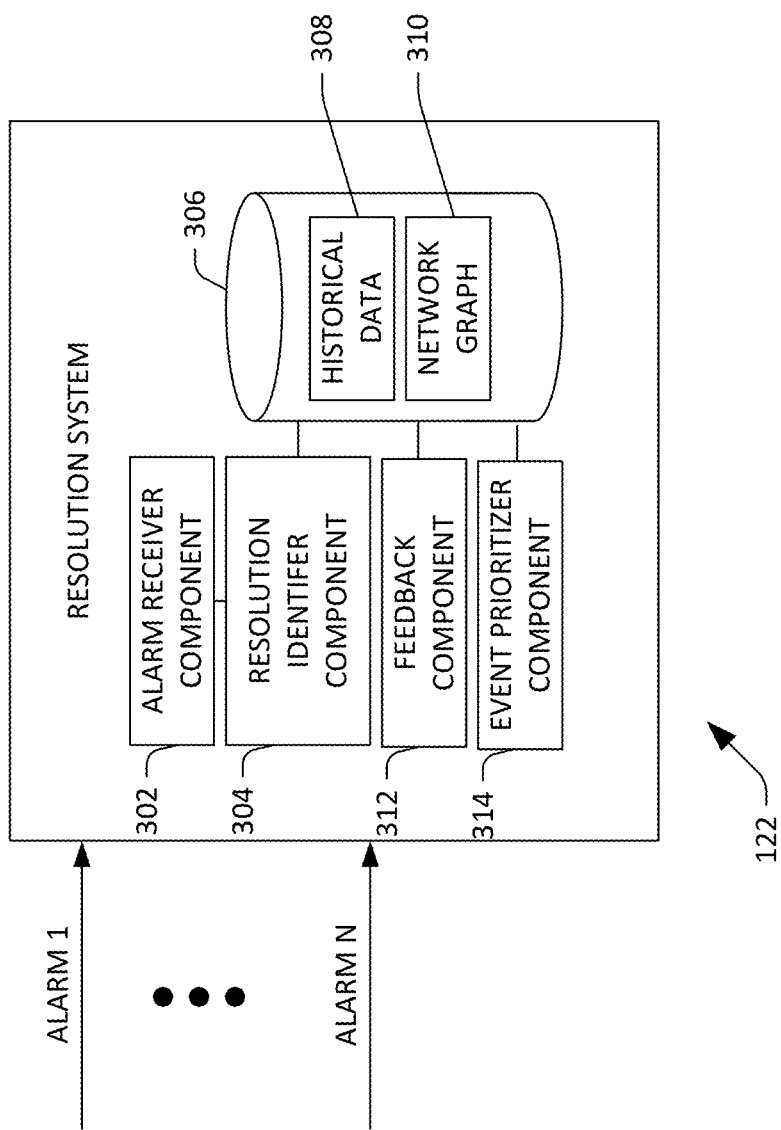
FIG. 3 is a functional block diagram of an exemplary resolution system that receives alarms generated by network devices in a data center and outputs troubleshooting options and debugging steps responsive to receiving the alarms.

With reference now to FIG. 3, a functional block diagram of the resolution system 122 is illustrated. As indicated above, the resolution system 122 can receive alarms generated by multiple devices in the data center 100 at different points in time. The resolution system 120 includes an alarm receiver component 302 that receives the alarms generated by the devices in the data center 100. A resolution identifier component 304 is in communication with the alarm receiver component 302, and is configured to ascertain whether the alarm received by the alarm receiver component 302 is indicative of an actionable network failure (e.g., a network failure that the operator 126 can resolve via troubleshooting and debugging). Pursuant to an example, an alarm generated by the router 118 can indicate that the router 118 is unable to communicate with the switch 116, which can in turn (for example) indicate any of 1) the router malfunctioning 2) the switch being down; 3) loose cabling on the network link between the router 118 and the switch 116; etc. These are actionable network failures that can be resolved by the operator 126.

The resolution system 122 can include or have access to a data store 306 that comprises historical data 308. As will be described in greater detail below, the historical data 306 can comprise "failure history tables" for devices and links in the data center 100, wherein a failure history table for a device or link can include information that is descriptive of past failures of the device or link, including failure symptoms, times of most recent failure, number of failures over a threshold period of time, configuration changes, and the like.

In operation, the alarm receiver component 302 receives an alarm, which includes failure conditions. The failure conditions can include time of generation of the alarm, identity of the device or link that exhibits a failure symptom, identity of the device that generated the alarm, identification of an interface that corresponds to a detected event, identity of a data center that includes the device or link that exhibits the failure symptom, etc. The resolution identifier component 304, based upon the alarm (and optionally other received alarms), can determine that the alarm is indicative of an actionable network failure, and can further identify a failing device or link based upon the contents of the alarm (e.g., in some cases the device that generates the alarm is not the failing device). The resolution identifier component 304 can map the failure conditions indicated in the alarm and associated telemetry data to a set of previously observed failure symptoms included in the historical data 308. In an example, the failing device or link may have previously exhibited the failure symptoms, a device of the same type as the failing device may have previously exhibited the failure symptoms, a device sharing a platform with the failing device may have previously exhibited the failure symptoms, a neighboring device in the network (e.g., 1-2 hops upstream or downstream from the failing device) may have previously exhibited the failure symptoms, etc. It is further contemplated that in instances where the failure conditions of the alarm cannot be mapped to a symptom, then static guidelines can be surfaced to the operator 126.

Responsive to the observed symptom(s) being identified via the mapping, the resolution identifier component 304 can perform a statistical analysis over the historical data 308 to identify a plurality of recommended troubleshooting options, as well as debugging steps that respectively correspond to the troubleshooting options, for use by the operator 126 to resolve the network failure. Further, the troubleshooting options and associated debugging steps can each be ranked by confidence, such that troubleshooting options and debugging steps with highest confidence of resolving the network problem are presented most prominently to the operator 126.

For example, the resolution identifier component 304 can determine that a network alarm generated by the switch 116 indicates that the third computing device 108 in the data center 100 is not responding to heartbeat requests, which can be mapped to, for example, the following previously observed failure symptoms for the third computing device 108 (or other devices in the data center 100 or in another data center): 1) "link flapping"; and 2) "device down". For each of such symptoms identified by the resolution identifier component 304, the resolution identifier component 304 can identify troubleshooting options and corresponding debugging steps in the historical data 308 indicated as previously being performed to resolve network failures that have such a symptom. Moreover, the resolution identifier component 304 can assign labels to the troubleshooting options and debugging steps that are respectively indicative of probabilities that the troubleshooting options and debugging steps will mitigate the network failure. An exemplary structure of data in the historical data 308 that facilitates identifying of the symptoms, the troubleshooting options, debugging steps, and labels is described in further detail below.

In an exemplary embodiment, the resolution identifier component 304 can then output the symptoms, the troubleshooting options, the debugging steps, and the corresponding labels to the operator 126. Effectively, then, the operator 126 is provided with a prioritized list of troubleshooting options and resolution steps for each symptom that is mapped to the failure conditions of the received alarm (which is indicative of an actionable network failure). The operator 126 may then step through troubleshooting options and debugging steps in an order based upon the labels assigned to the troubleshooting options and debugging steps, resulting in relatively efficient resolution of the network failure.

In another exemplary embodiment, the resolution identifier component 304 can identify at least one troubleshooting option and at least one debugging step, and can transmit a signal to a device in the data center 100 that causes the at least one troubleshooting option to be selected and the at least one debugging step to be performed, without intervention from the operator 126. In a non-limiting example, the resolution identifier component 304 can determine that there is a relatively high probability that rebooting the switch 116 will mitigate an observed network failure symptom. The resolution identifier component 304 can transmit a signal to the switch 116 that causes the switch 116 to be rebooted, without surfacing the alarm to the operator 126 or otherwise requiring operator intervention.

In an example, the resolution identifier component 304 can attempt to automatically resolve a network failure prior to surfacing troubleshooting options and debugging steps to the operator 126 when 1) a computed probability of a troubleshooting option and debugging step resolving the network failure is above a predefined probability threshold (e.g., 0.9); 2) the computed probability of the troubleshooting option and debugging step resolving the network failure is among a k-highest probabilities for troubleshooting options and debugging steps resolving the network failure (e.g., among the three troubleshooting options and debugging steps that are most probable to resolve the network failure); 3) automatic selection of the troubleshooting option and performance of the debugging step does not result in a redundancy failure; 4) automatic selection of the troubleshooting option and performance of the debugging step does not take more than a threshold amount of time (e.g., one minute); and/or 5) automatic selection of the troubleshooting option and performance debugging step does not remove a device that facilitates transport of a relatively high volume of traffic through the data center 100. Other factors for determining when to automatically select a debugging option and perform a debugging step are also contemplated.

The resolution identifier component 304 can further be configured to surface additional data pertaining to network failures to the operator 126. For example, the resolution identifier component 304 can query the historical data 308 to aggregate failure data across a variety of dimensions. In an example, with respect to a particular failing device or link (e.g., identified as being a failing device or otherwise identified by the operator 126), the resolution identifier component 304 can output data that is indicative of a number of times that the device or link has failed (e.g., over a threshold historical time window), frequency of the device or link failing relative to frequency of other devices or links in the data center 100 failing, frequency of the device failing relative to frequency of other devices of the same type in the data center 100 failing, etc.

In another example, the operator 126 can set forth a request for information pertaining to a particular device type, platform, or data center, and the resolution identifier component 304 can aggregate failure data across a variety of parameters to surface failure information for the operator 126. In a non-limiting example, responsive to receiving a request from the operator 126 for information about a device platform, the resolution identifier component 304 can output data that identifies most frequently failing devices on that platform, frequency of device failure on the platform relative to other platforms, frequency of failures of devices of different types relative to one another, etc.

In yet another example, the operator 126 can request surfacing of information about a data center dimension/axis, rather than a specified device or device type. For instance, the operator 126 can request identification of most frequently failing devices in the data center 100, and the resolution identifier component 304 can return a list of devices in the data center 100 that fail most frequently. Similarly, the operator 126 can request identification of most stable devices in the data center 100, and the resolution identifier component 304 can return a list of devices in the data center 100 that fail least frequently. The structure of the historical data 308 facilitates aggregation of information about numerous dimensions/axes.

The resolution system 122 may also include a feedback component 312 that is configured to receive feedback from the operator 126 as to symptoms observed for a failing device, troubleshooting options and/or debugging steps undertaken to correct a network failure caused by the failing device, amongst other information. The feedback component 312, responsive to receiving input from the operator 126, may then be configured to update the historical data 308 (e.g., a historic failure table for the failing device). Thus, when an alarm is subsequently received by the resolution system 122, the resolution identifier component 304 can output updated failure symptoms, troubleshooting options, debugging steps, and/or labels based upon the recent observations of the operator 126.

The resolution system 122 may optionally include an event prioritizer component 314 that prioritizes actionable network failures for presentation to the operator 126. For example, during a particular time window (e.g., due to an operating system patch rollout), numerous devices in the data center 100 may generate alarms, conventionally requiring the operator 126 to parse through a large volume of alarms to determine which alarms represent actionable network failures, and to further prioritize network failures. The event prioritizer component 314 lessens the burden on the operator 126 by correlating several alarms to represent a singular network failure, and prioritizing network failures (e.g., as a function of impact of the network failure).

In connection with prioritizing network failures, the data store 306 can include a network graph 310, which is representative of a hierarchical network topography of the data center 100, and the event prioritizer component 314 can prioritize network failures based upon the network graph 310. For example, a network failure caused by a device close to the top of the network hierarchy (as identified in the network graph 308) poses a high risk of service outage and can, therefore, be prioritized higher than network failures caused by devices lower in the network hierarchy. In another example, the event prioritizer component 312 can prioritize network failures as a function of a number of properties that may be impacted due to the respective network failures (or even a single property with a risk of high business intelligence impact).

Now referring to FIG. 4, a functional block diagram of the resolution identifier component 304 is depicted. The resolution identifier component 304 receives an alarm 400 generated by a device in the data center 100. For example, the device may be one of the computing devices 104-110 or one of the network infrastructure devices 114-120. In the example shown in FIG. 4, the alarm 400 includes a plurality of failure conditions: 1) a timestamp that indicates when the alarm was generated by the device; 2) an alarm ID that identifies a unique alarm generated from a device; 3) a device II) that identifies the device that generated the alarm; 4) an interface link that identifies a particular port or network link that is experiencing a failure; and 5) and an event description, which includes machine generated text providing more details on the failure and is output by the device that generated the alarm 400. It is to be understood that content of the alarm 400 can differ from what is shown in FIG. 4 and described herein.

The resolution identifier component 304 receives the alarm 400 and, in an exemplary embodiment, can determine whether the alarm is indicative of an actionable network failure. With more specificity, the resolution identifier component 304 includes a failure identifier component 402 that analyzes the alarm 400 and can identify that the alarm 400 represents an actionable network failure, and can further identify a failing device or link (e.g., based upon the device ID and/or the network graph 310). For example, the device that generated the alarm 400 (the generating device) may be operating properly; however, a network infrastructure device (the failing device) connected to the device that generated the alarm (e.g., by way of the interface link identified in the alarm 400) may be failing. In an example, the event description in the alarm 400 can indicate that the device identified by the device ID is not responding to heartbeat requests over a particular network link.

Further, the failure identifier component 402 can assign metadata to the alarm 400 that is indicative of severity of a network failure indicated by the alarm. In an example, responsive to the failure identifier component 402 identifying the failing device or link, the failure identifier component 402 can identify traffic loss that is caused by the device or link failing. For example, the failure identifier component 402 can assign one of a plurality of predefined values to the alarm 400 based upon a volume of traffic loss that may be caused by an event represented by the alarm 400. Thus, the failure identifier component 402 can assign one of "high", "medium", or "low" to the alarm 400 to represent severity of the network alarm. Pursuant to an example, this value can be placed in a device failure history table and/or a link failure history table.

Moreover, the failure identifier component 402 can assign a value to the alarm 400 that is indicative of risks related to redundancy in the data center 100. For instance, the value can indicate whether the failure represented by the alarm 400 causes traffic loss within a redundancy group. For events where redundancy is effective and traffic loss is minimal, a troubleshooting option can be automatically selected and a debugging step can be automatically performed to auto-triage the failure event represented by the alarm 400. Exemplary values can include "redundancy successful", "redundancy failure", or "redundancy at risk", wherein "redundancy at risk" can indicate that the failing device or link is single legged.

The resolution identifier component 304 further includes a mapper component 404. Responsive to the failure identifier component 402 identifying the failing device or link, the mapper component 404 can access the historical data 308 and map the failure conditions (and associated telemetry data) indicated in the alarm 400 (or a group of correlated alarms that are representative of the network failure) to at least one previously observed symptom represented in the historical data 308.

With more particularity pertaining to an exemplary structure of the historical data 308, the historical data 308 can comprise a plurality of device failure history tables 406-408 and a plurality of link failure history tables 410-412, wherein each failure history table in the device failure history tables 406-408 is for a respective device in the data center 100, and each failure history table in the link failure history tables 410-412 is for a respective link in the data center 100. Optionally, the historical data 308 can include failure history tables for devices/link in other data centers. Further, while the historical data 308 is shown as being centralized, it is to be understood that the failure history tables 406-412 can be distributed over numerous storage devices.

The first device failure history table 406 can include historic failure information for a first device in the data center 100. This failure information can include, but is not limited to including: 1) data that is descriptive of the first device, including identity of the first device, manufacturer of the first device, type of the first device, model of the first device, platform of the first device, etc.; 2) availability of the first device over time (and amount of time that has passed since a most recent failure); 3) network monitoring data, such as traffic passing through the first device, current CPU and memory utilization of the first device, CPU utilization of the first device over time, memory utilization of the first device over time, a number of connections of the first device, etc.; 4) data indicative of configuration changes made to the first device; 5) observed failure symptoms for the first device, troubleshooting options previously employed to alleviate the failure symptoms, and debugging steps previously taken to resolve the failure symptoms; 6) hardware and software changes performed on the first device; 7) identities of engineers and operators who have historically worked on the device; and 8) number of out-of-warranty component replacements made on the first device. The nth device failure history table 408 can include analogous information. Turning briefly to FIG. 5, content of an exemplary failure history table 500 is illustrated The first link failure history table 410 can include historic failure data for a first link in the data center. This failure information can include, but is not limited to including, 1) data that is descriptive of the first link, including identity of the first link, devices connected via the first link, manufactures of such devices/links, platforms of such devices, etc.; 2) availability of the first link over time (and amount of time that has passed since a most recent failure); 3) network monitoring data, such as current traffic passing over the link, historic traffic over the link, etc.; 4) data indicative of configuration changes to devices coupled via the link; 5) observed failure symptoms for the link, troubleshooting options previously employed to alleviate the failure symptoms, and debugging steps previously taken to resolve the failure symptoms; 6) hardware and software changes performed on devices connected via the link, 7) type of link e.g., copper vs. optical, 8) capacity of link etc. The pith link failure history table 412 can include analogous information.

Thus, the mapper component 408 can receive the alarm 400 and map failure conditions in the alarm 400 to at least one observed symptom for the failing device identified in at least one of the device failure history tables 406-408 or the link failure history tables 410-412. For instance, the mapper component 404 can initially access the failure history table of the failing device, and ascertain if the failure conditions map to previously observed failure symptoms for the failing device. The mapper component 404 can then expand the search to neighboring devices in the network and/or devices of the same type and/or model as the failing device to identify previously observed failure symptoms that map to the failure conditions indicated in the alarm 400. In a non-limiting example, the mapper component 404 can map the failure conditions of the alarm 400 to previously observed symptoms: 1) "device down"; and 2) "link flapping" for the failing device, as identified in the failure history table for the failing device.

The resolution identifier component 304 further includes a label assignor component 414 that identifies troubleshooting options identified in the historical data 308 as being previously undertaken to resolve the network failure symptom identified by the mapper component 404. The label assignor component 414 further assigns labels to respective troubleshooting options, wherein a label is indicative of a probability that the troubleshooting option will mitigate the network failure symptom.

In an exemplary embodiment, the label assignor component 414 can initially search the device failure history table of the failing device (or a link failure history table for a failing link) to ascertain whether any troubleshooting options and/or debugging steps have been previously undertaken for the observed symptoms and device. When the failing device and/or link has been subjected to a relatively large amount of troubleshooting and debugging, the label assignor component 414 may not need to perform further searching over the historical data 308. For example, when the failure history table for the failing device indicates that the troubleshooting option of rebooting the device has previously (and with high confidence) alleviated the failure symptom exhibited by the failing device, the label assignor component 414 can output the troubleshooting option without analyzing content of other failure history tables of other devices. Alternatively, when the failure history table for the failing device indicates that the failing device has not previously exhibited the symptom (or has infrequently exhibited the symptom), then the label assignor component 414 can search failure history tables of other devices, such as neighboring devices in the network topology, devices by the same manufacturer, devices of the same type, etc. By searching over the failure history tables 406-412 in the historical data 308, the label assignor component 414 can identify previously successful troubleshooting options and debugging steps, as well as respective confidence labels, for resolving the failure symptom.

The resolution identifier component 304 can further comprise an output component 416 that outputs the troubleshooting options, debugging steps, and corresponding labels. In an example, the output component 416 can output such troubleshooting options, debugging steps, and labels to a display of the computing device 124 employed by the operator 126. In another example, the output component 416 can transmit the troubleshooting options, debugging steps, and labels to a different computing device. In yet another example, the output component 416 can cause a troubleshooting option to be automatically selected and a debugging step to be automatically performed without operator intervention.

In addition to outputting the troubleshooting options and debugging steps, the output component 416 can also output (for a failing device or link), a summary failure history table for presentment to the operator 126. This can provide the operator 126 with historical context pertaining to previous device or link failures. For example, the resolution identifier can maintain a summary failure history table for devices and/or links in the data center 100, wherein an exemplary summary failure history table can include, but is not limited to including: 1) a name of the device or link; 2) an indication as to the failure rate of the device or link relative to other devices or links (e.g., an indication as to whether the device or link is a top-k problematic device); 3) recent changes made to the device or link (e.g., hardware, software; and/or configuration changes); 4) an amount of time since the last time the device or link failed; and 5) recent troubleshooting options selected and/or operators that performed troubleshooting.

Figure 6:
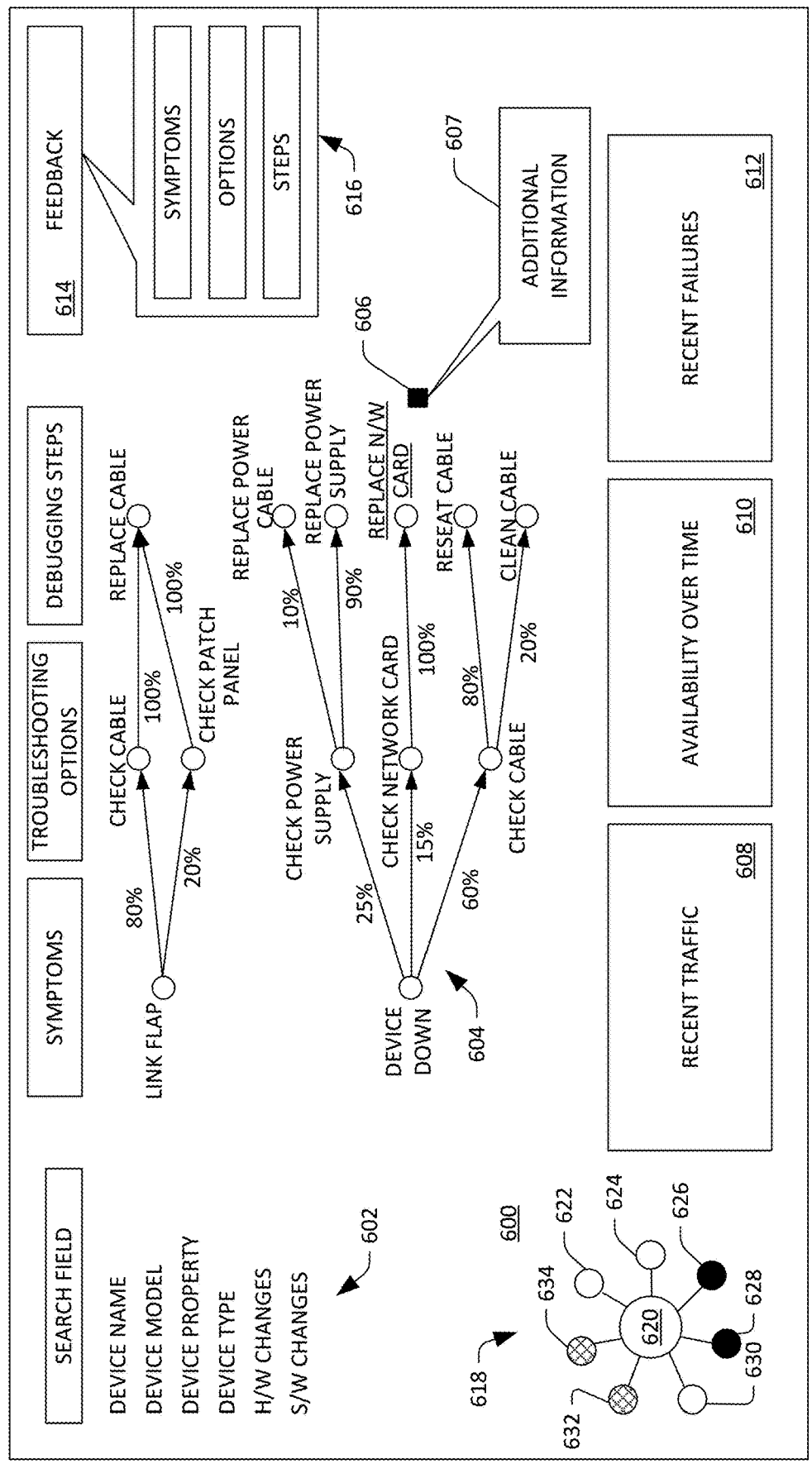
FIG. 6 is an exemplary graphical user interface that depicts potential troubleshooting options and debugging steps for resolving a network failure indicated by an alarm.

Referring now to FIG. 6, an exemplary graphical user interface 600 that can be presented on the display of the computing device 124 employed by the operator 126 is illustrated. The graphical user interface 600 can be generated by the resolution identifier component 304. The graphical user interface includes a field 602 that presents the following information to the operator 126 pertaining to either the failing device identified by the failure identifier component 402 or a device otherwise of interest to the operator 126: 1) the name of the failing device; 2) the model of the failing device; 3) an identity of the data center that includes the failing device; 4) a property of the failing device; 5) a type of the failing device; 6) recent hardware changes and recent software changes; and 7) links to tickets that describe these changes in more detail.

The graphical user interface 600 additionally includes a field 604 that illustrates previously observed symptoms that map to the contents of a received alarm (e.g., the alarm 400). As shown in FIG. 6, exemplary symptoms can include "link flap" and "device down." The field 604 also includes, for each observed symptom, a plurality of potential troubleshooting options. For example, for the "device down" system, the following troubleshooting options are displayed in the field 604: 1) "check cable"; 2) "check power supply"; and 3) "check network card". The troubleshooting options have respective labels assigned thereto that are indicative of the probabilities that the respective troubleshooting options will alleviate the corresponding failure symptom. For example, the "check cable" troubleshooting option is assigned a label that indicates that there is a 60% probability that troubleshooting the failure symptom "device down" through utilization of at least one debugging step corresponding to such troubleshooting option will alleviate the problem. Similarly, the "check power supply" troubleshooting option can be assigned a label that indicates that there is a 25% probability that performing debugging step(s) corresponding to such troubleshooting option will result in alleviating the failure symptom.

As ascertained, each troubleshooting option has at least one debugging step corresponding thereto. For example, the troubleshooting option "check cable" has two debugging steps corresponding thereto (and illustrated in the graphical user interface 600): 1) "reseat cable"; and 2) "clean cable." These debugging steps are also assigned labels that are indicative of respective probabilities that the resolution steps will resolve the failure symptom (when the parent troubleshooting option is selected).

Additionally, some debugging steps may have further instructions assigned thereto to assist the operator 126 in performing the debugging steps. For example, for the "replace network card" debugging step, further instructions can be presented to the operator 126 responsive to the operator selecting a graphical icon 606 in the graphical user interface 600 that is positioned adjacent to the aforementioned resolution step. This can result in a pop-up window 607 (or a separate window) to be displayed that provides the operator 126 with additional information about replacing the network card. The additional information, in an exemplary embodiment, can have hyperlinks assigned thereto, wherein selection of a hyperlink by the operator 126 can direct the operator to additional information.

The graphical user interface 600 may further include various fields 608-612 that can include graphical data (e.g., graphs) that are representative of various operating parameters of the failing device. For instance, the field 608 can depict a graph that illustrates volume of traffic passing through the failing device over a particular window of time, the field 610 can depict a graph that is representative of availability of the failing device over a window of time, and the field 612 can depicts a graph that illustrates points in time when the failing device was observed to have failed.

The graphical user interface 600 can also include features that facilitate receipt of feedback from the operator 126. For example, a button 614 can be included in the graphical user interface 600 that, when selected, causes a window 616 to be presented to the operator 126, where the window 126 includes several fields that can be populated by the operator 126. This allows the operator 126 to identify symptoms observed when troubleshooting the failing device, a troubleshooting option employed by the operator 126 when troubleshooting the failing device, and debugging steps undertaken by the operator 126 when troubleshooting the failing device.

The graphical user interface 600 can also include a graphical object 618 that is representative of a topological view of a portion of the data center 100, wherein the device identified in the field 602 can be represented as a center graphical icon 620 in the graphical object 618, and devices one hop from the device identified in the field 602 can be represented by graphical icons 622-634 surrounding the central graphical icon 620 (e.g., with connections between graphical icons representing links therebetween). Furthermore, the graphical icons 620-634 can be color-coded to indicate the types of the respective devices represented by the graphical icons 620-634. In another example, the graphical icons 620-634 in the graphical object 618 can have respective shapes that are indicative of the types of the devices represented by the graphical icons. For instance, a graphical icon shaped as a square can represent a core router, a graphical object shaped as a circle can represent a VPN, etc. The graphical icons 620-634 in the graphical object 618 can be selectable, wherein selection of a graphical icon causes information about the device represented by the graphical icon to be set forth in the field 602 (and other fields in the graphical user interface 600). In yet another example, shape of a graphical icon can represent a type of device represented by the icon, and color of the graphical icon can represent a manufacturer of the device. Other variants are also contemplated.

Figure 7:
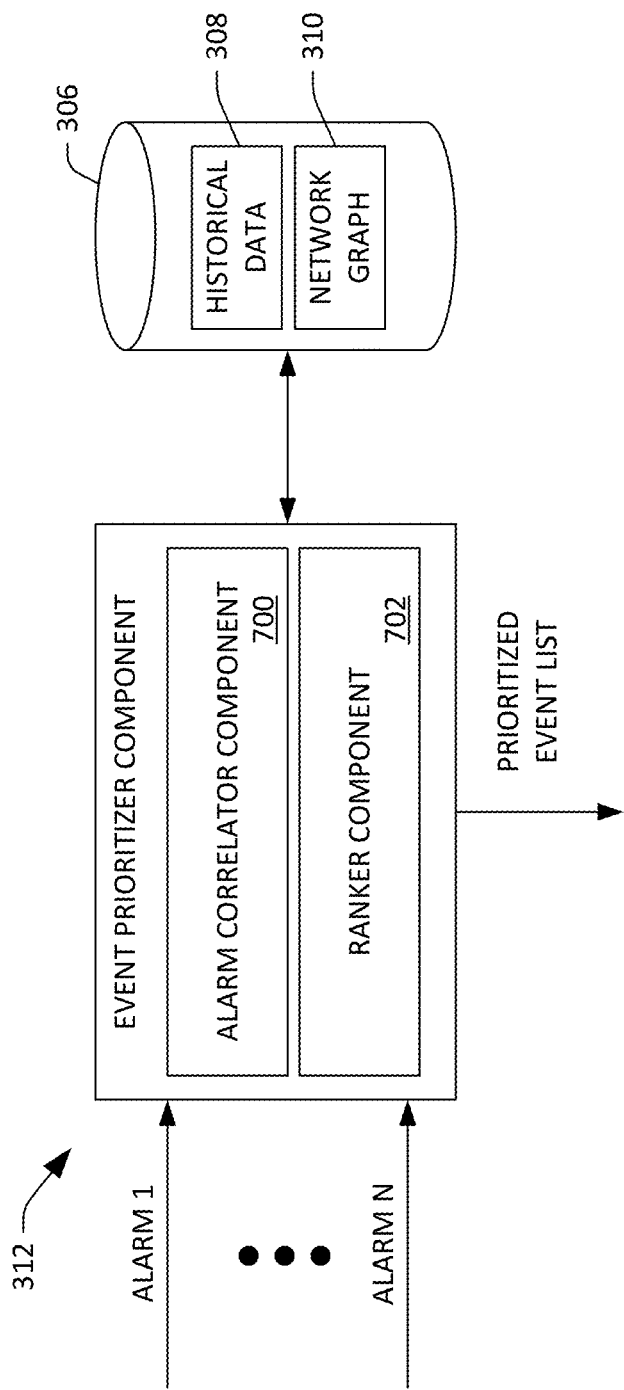
FIG. 7 illustrates an exemplary alarm prioritizer component that is optionally included in the resolution system.

Now referring to FIG. 7, an exemplary depiction of the event prioritizer component 312 is illustrated. The event prioritizer component 312 can receive alarms generated by devices in the data center 100. The event prioritizer component 312 includes an alarm correlator component 700, wherein the alarm correlator component 700 correlates alarms into respective groups, wherein the groups are representative of respective network failures. In an exemplary embodiment, the alarm correlator component 700, upon receipt of an alarm, can execute a search in the historical data 308 to identify recent alarms that may be related to the received alarm. For example, the alarm correlator component 700 can search the historical data 308 for previous alarms generated by the same device and/or for the same interface (e.g., over some threshold historical time window, such as the most recent 30 minutes). In an exemplary embodiment, the alarm correlator component 700 can group the received alarm with other alarms generated by the same device and/or for the same interface within the threshold time window. In another example, the alarm generator component 700 can group the received alarm with at least one alarm generated by neighboring devices in the network topology (where the alarm correlator component 700 identifies the neighboring devices through analysis of the network graph 310). For example, the alarm correlator component 700 can group the alarm with alarms generated on neighboring devices that are 1 to 2 hops upstream or downstream of the failing device in the hierarchical network topology, and that have been generated within a threshold amount of time from the time that the received alarm was generated. In addition, the alarm correlator component 700 can group the received alarm with at least one other alarm generated by one or more devices in a network redundancy group (with the device that generated the alarm) that may be correlated (e.g. illustrating a problem with a failover protocol). It can be ascertained that a group of alarms can be representative of a singular network failure, and different groups of alarms can represent different network failures.

With more detail relating to the operation of the alarm correlator component 700, for each received alarm, the alarm correlator component 700 can attempt to match the alarm with a priority event or a trouble ticket (if present). For example, the alarm correlator component 700 can perform the matching on a variety of fields: 1) network device and/or interface name. A device name is typically coded as aa-bb-cc-dd, where aa is data center, bb is platform name, cc is name of the hosted service or application, and dd is a logical number related to the deployment of the device that generated the alarm; 2) the type of the device, 3) an error message; and 4) event notification time. To compare string-based fields (device name and error message), the alarm correlator component 700 can use a variety of string matching algorithms (e.g., edit distance, Aho-Corasick pattern matching, Levenshtein distance, etc.). This allows for the matching of an alarm with possible matches in the recent past (based on setting a threshold on the notification time). Second, the alarm correlator component 700 can perform the matching based on failures occurring on neighboring devices. Neighbors are determined by analyzing the network graph 310 based on link level connectivity. Third, the alarm correlator component 700 can perform a match based upon the type of network device—e.g. a configuration bug across load balancers in the same data center or across multiple data centers resulting in a large correlated failure.

The event prioritizer component 312 also includes a ranker component 702 that ranks groupings of alarms (failure events) for troubleshooting. The ranker component 702 can be configured to prioritize events to minimize negative impact on the data center 100 and/or customers of the data center 100. For example, the ranker component 702 can prioritize events based upon a failing device being close to a top of a network hierarchy, as such devices pose a relatively high risk of service outage. In another example, the ranker component 702 can prioritize events as a function of a number of properties which may be impacted due to the failure of the device. Further, impact of a single property may cause the ranker component 702 to assign a relatively high priority to an event. In another example, the ranker component 702 can prioritize events based upon the amount of traffic carried by a failing device. In yet another example, the ranker component 702 can prioritize events based upon an impact on traffic through the data center 100—e.g. failure of the device may cause significant loss of traffic. In still yet another example, the ranker component 702 can prioritize events based upon a potential redundancy failure. For instance, failure events not masked by intra-device or inter-device redundancy can be relatively highly ranked. Finally, the ranker component 702 can prioritize failure events caused by or impacting a single-legged device. For example, events pertaining to where failover was successful, but which pose a danger of causing a redundancy failure, can be relatively highly ranked. The output of the event prioritizer component 312 is thus a prioritized list of events, such that the operator 126 can prioritize network failures to minimize their impact on hosted applications and services.

Figure 8:
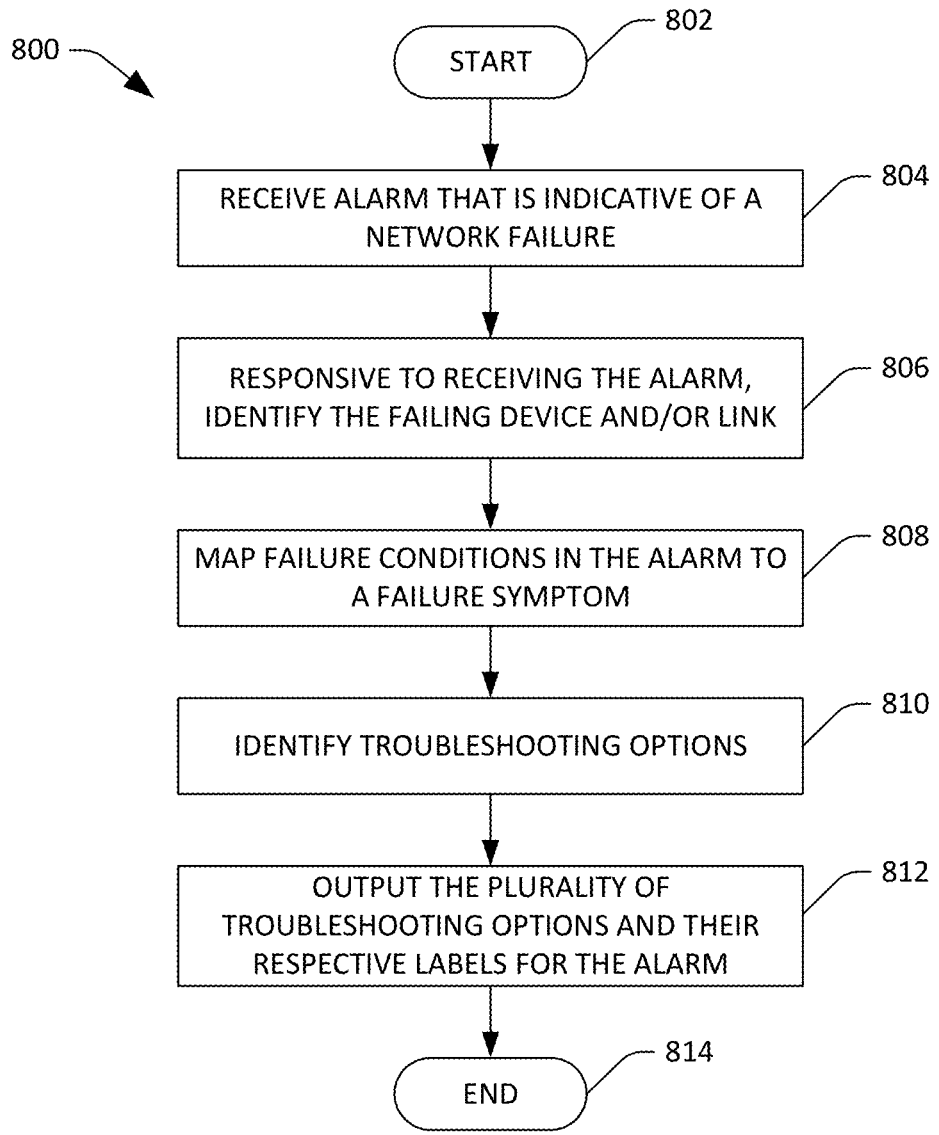
FIG. 8 is a flow diagram that illustrates an exemplary methodology for outputting troubleshooting options for resolving a network failure indicated by an alarm generated by a network device.
Figure 9:
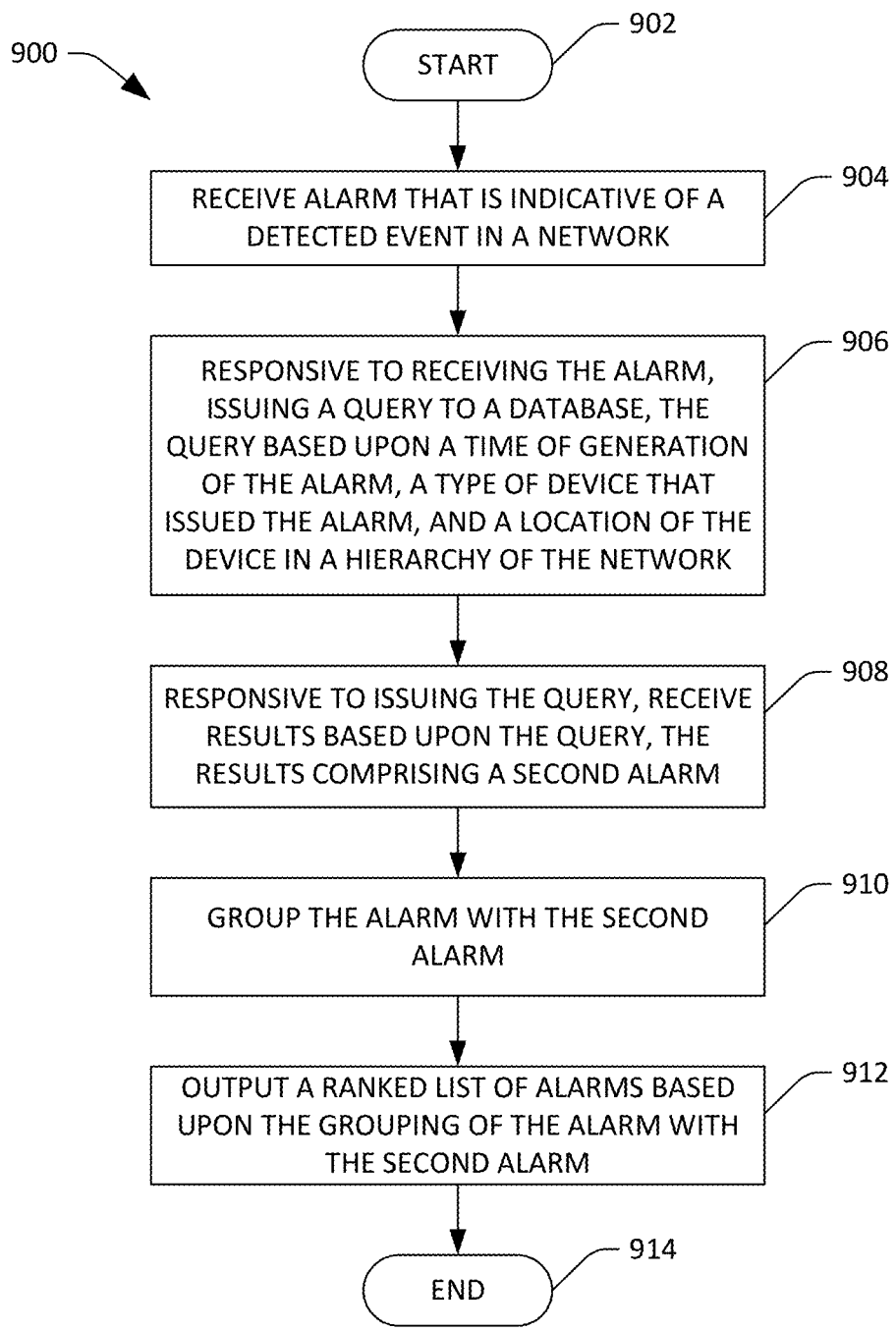
FIG. 9 is a flow diagram that illustrates an exemplary methodology for first grouping related alarms and then outputting a ranked list of network failures.
Figure 10:
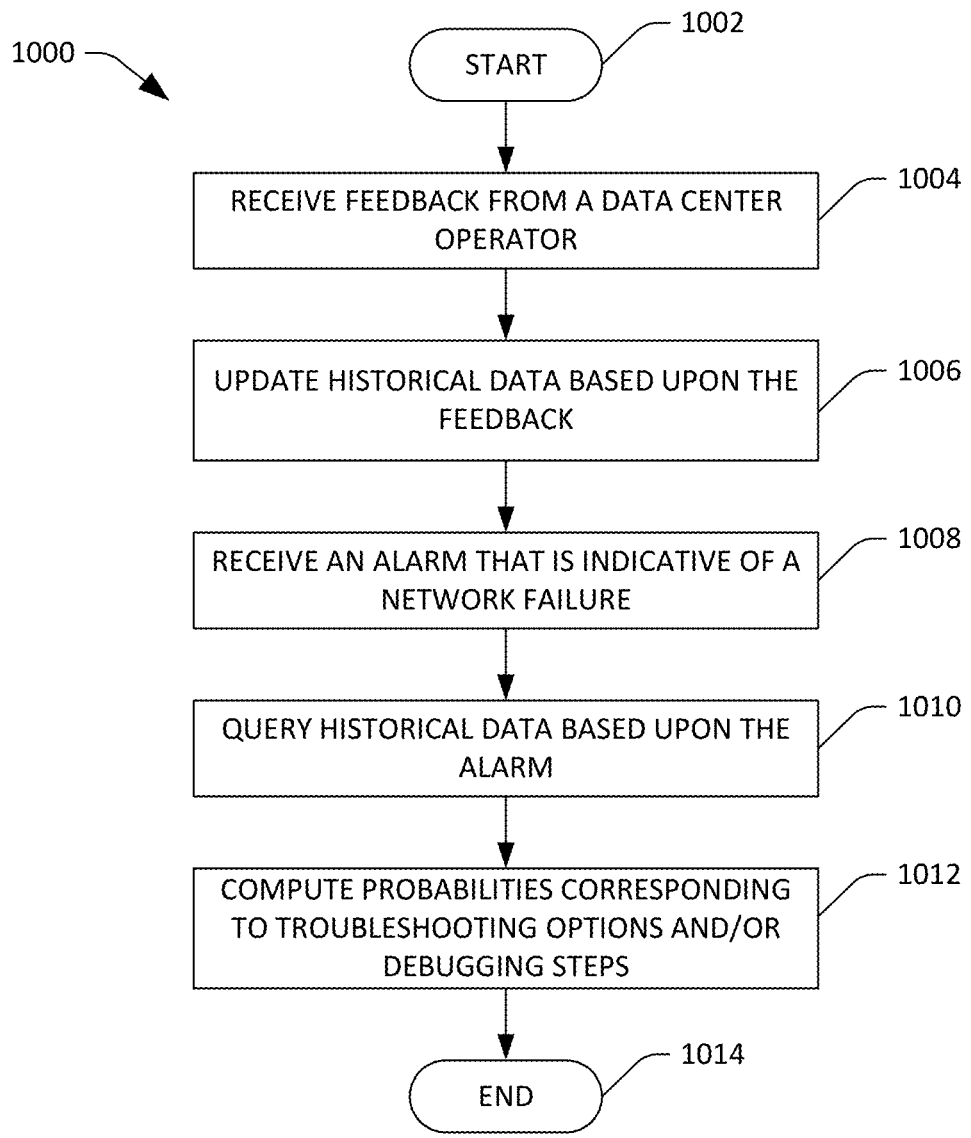
FIG. 10 is a flow diagram that illustrates an exemplary methodology for updating historical data pertaining to a data center based upon operator feedback.

FIGS. 8-10 illustrate exemplary methodologies relating to resolving network failures. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to FIG. 8, a flow diagram illustrating an exemplary methodology 800 for outputting a plurality of troubleshooting options for use when troubleshooting a network failure is illustrated. The methodology 800 starts at 802, and at 804 an alarm that is indicative of a network failure is received. The alarm is generated by a device in a data center, which can be a computing device or a network infrastructure device. The alarm can identify the device that is believed to be failing, the device that generated the alarm, an interface on the failing device that is affected, a timestamp that indicates when the alarm was generated, amongst other data.

At 806, responsive to receiving the alarm, a failing device and/or failing link is identified. The failing device may be the device that generated the alarm or a device in communication with the device that generated the alarm. It is to be understood that when the failing device generates the alarm, it does not necessarily mean that the entire device has gone down. Rather, the alarm could indicate that one of the links of the device has gone down, CPU utilization of the device has exceeded a pre-determined threshold, memory utilization has exceeded a pre-determined threshold, etc. At 808, responsive to identifying the failing device, the failure conditions indicated in the alarm are mapped to historically observed failure symptoms, wherein the failure symptoms may have been previously observed as being exhibited by the failing device, by devices related to the failing device, etc. As indicated above, failure history tables can be maintained for respective network devices, which facilitate mapping the failure conditions in the alarm to the possible failure symptoms.

At 810, for an identified failure symptom, a plurality of troubleshooting options are identified, wherein the troubleshooting options are indicative of potential resolutions for curing the failure symptom. Further, the troubleshooting options can have respective labels assigned thereto that are indicative of probabilities of the troubleshooting options curing the failure symptom. The labels can be probabilities or more discreet labels (e.g., high confidence, medium confidence, low confidence etc.). At 812, the plurality of troubleshooting options and their respective labels are output for use by an operator to resolve the network failure. As noted above, the labels can be indicative of confidences that the troubleshooting options, when taken by the operator, will respectively mitigate the network failure. The methodology 800 completes at 814.

Now referring to FIG. 9, an exemplary methodology 900 that facilitates grouping alarms to identify a network failure and prioritizing network failures is illustrated. The methodology 900 starts at 902, and at 904 an alarm is received that is indicative of a network failure. At 906, responsive to receiving the alarm, a query is issued to a database. The query is based upon a time of generation of the alarm, a type of device that issued the alarm, and a location of the device in a hierarchy of the network. At 908, responsive to issuing the query, results are received based upon the query, the results comprising a second alarm. At 910, the alarm is grouped with the second alarm, and at 912, a ranked list of alarms is output based upon the grouping of the alarm with the second alarm. The methodology 900 completes at 914.

With reference now to FIG. 10, an exemplary methodology 1000 for receiving feedback as to troubleshooting options and/or debugging steps and updating probabilities corresponding to the troubleshooting options and/or debugging steps based upon the feedback is illustrated. The methodology 1000 starts at 1002, and at 1004 feedback from an operator is received. The feedback can identify 1) a network device or link that failed (e.g., including a type of device, a platform of the device, a location of the device in a network topography, etc.); 2) a symptom of the failure; 3) an identity of a troubleshooting option taken by the operator to mitigate the failure; 4) an indication of whether the troubleshooting option successfully mitigated the failure; 5) an identity of a debugging step performed by the operator to mitigate the failure; and 6) an indication of whether the debugging step successfully mitigated the failure.

At 1006, historical data that is descriptive of network failures is updated based upon the feedback. With more particularity, a device failure history table and/or a link failure history table can be updated based upon the received feedback. At 1008, subsequent to the historical data being updated an alarm is received, and at 1010 the historical data is queried based upon the alarm. For example, the historical data can be queried over several dimensions (e.g., device ID, device type, device platform, link ID, etc.). At 1012, probabilities for troubleshooting options and/or debugging steps that may potentially mitigate a network failure indicated by the alarm are computed (e.g., in real-time or offline). Such probabilities can be based upon the feedback from the operator, such that probabilities are refined over time as additional feedback is received. Moreover, if the operator were to have taken a troubleshooting option not previously employed in connection with the device, the historical data and/or probabilities can be updated with this new troubleshooting option, which may be later surfaced when a similar alarm is generated. The methodology 1000 completes at 1014.

Figure 11:
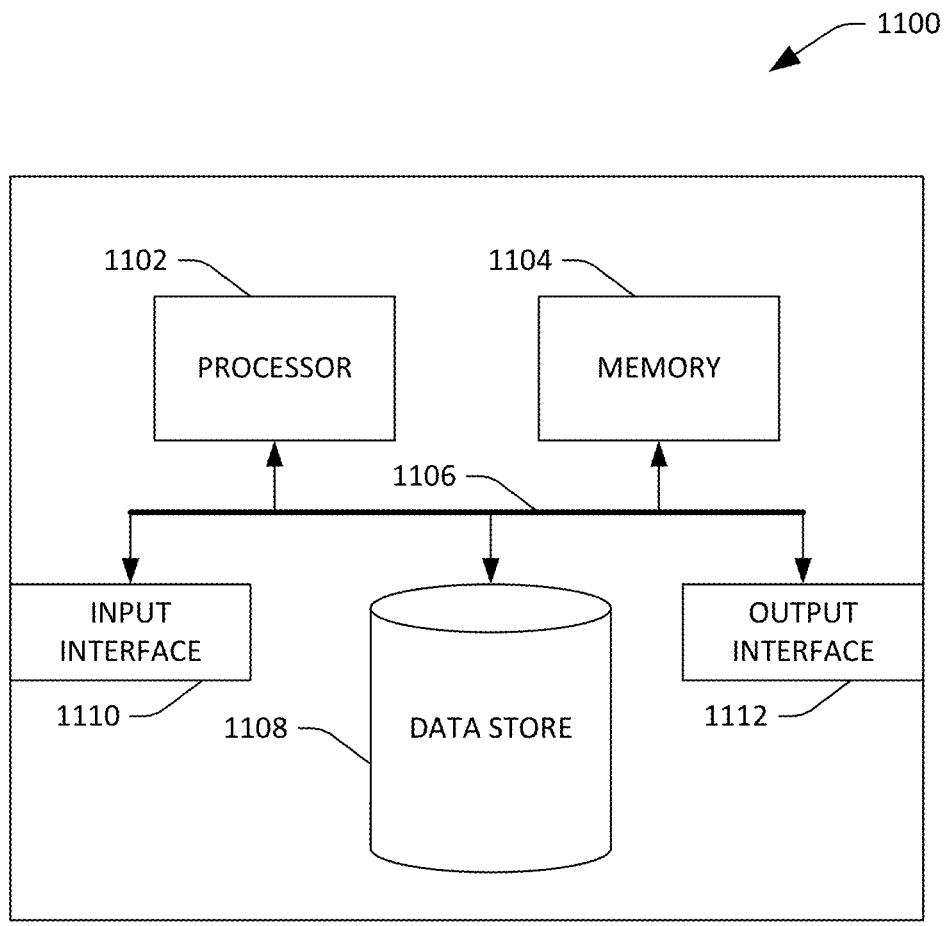
FIG. 11 is an exemplary computing system.

Referring now to FIG. 11, a high-level illustration of an exemplary computing device 1100 that can be used in accordance with the systems and methodologies disclosed herein is illustrated. For instance, the computing device 1100 may be used in a system that supports outputting troubleshooting options and debugging steps for curing failure symptoms in a data center. By way of another example, the computing device 1100 can be used in a system that supports prioritizing network failures for an operator. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store failure history tables, a network graph, etc.

The computing device 1100 additionally includes a data store 1108 that is accessible by the processor 1102 by way of the system bus 1106. The data store 1108 may include executable instructions, failure history tables, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

It is contemplated that the external devices that communicate with the computing device 1100 via the input interface 1110 and the output interface 1112 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1100 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1100 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system that is configured to resolve failures in a data center, the system comprising:
a processor;
a data store comprising a database, wherein the database includes historical data; and
memory that stores instructions that, when executed by the processor, cause the processor to perform acts comprising:
receiving, over a network connection, an alarm generated by a device in a data center, the alarm comprising a failure condition that is indicative of a failure in the data center, wherein the alarm identifies the device;
responsive to receiving the alarm, querying the database to identify a failure symptom in the historical data that is mapped to the failure condition;
responsive to querying the database to identify the failure symptom, identifying troubleshooting options in the historical data that are mapped to the failure symptom, wherein the troubleshooting options are included in the historical data due to the troubleshooting options being previously undertaken to mitigate failures with the failure symptom in the data center; and
responsive to identifying the troubleshooting options in the historical data, causing the troubleshooting options to be presented on a display to a data center technician.

2. The system of claim 1, the acts further comprising:
receiving feedback from the data center technician that the failure in the data center has been mitigated and that a troubleshooting option in the troubleshooting options was employed to mitigate the failure in the data center; and
updating the historical data based upon the feedback.

3. The system of claim 1, the acts further comprising:
computing probabilities that the troubleshooting options, when undertaken in response to the alarm, will mitigate the failure; and
causing the probabilities to be presented on the display.

4. The system of claim 1, wherein the historical data further comprises characteristics of the device, the characteristics of the device comprising at least one of: an identifier for the device, a type of the device, a model of the device, an identity of the data center that includes the device, logs of hardware changes to the device, or logs of software changes to the device, the acts further comprising:
presenting the characteristics of the device on the display.

5. The system of claim 1, wherein causing the troubleshooting options to be presented on the display to the data center technician comprises:

transmitting, over a second network connection the troubleshooting options to a computing device operated by the data center technician wherein the troubleshooting options are presented on the display.

6. The system of claim 1, the acts further comprising:
subsequent to causing the troubleshooting options to be presented on the display to the data center technician, transmitting a signal to the device, wherein the signal causes the device to perform a troubleshooting option in the troubleshooting options without human intervention.

7. The system of claim 1, wherein the device is one of a switch, a router, a re-router, a gateway, a hub, or a bridge.

8. The system of claim 1, the acts further comprising:
responsive to receiving the alarm, correlating the alarm with a second alarm generated by a second device in the data center, wherein the failure symptom is identified in the historical data based upon the alarm being correlated with the second alarm.

9. The system of claim 1, the acts further comprising:
receiving a selection of a troubleshooting option from the troubleshooting options; and
responsive to receiving the selection of the troubleshooting option, causing a debugging step to be presented on the display, the debugging step comprising an instruction for resolving the failure in the data center.

10. A method executed by a processor of a computing system, wherein the computing system comprises a data store that comprises a database, the database including historical data, the method comprising:
receiving, over a network connection, an alarm generated by a device in a data center, the alarm comprising a failure condition that is indicative of a failure in the data center, wherein the alarm identifies the device;
querying the database to identify a failure symptom based upon the failure symptom being mapped, in the historical data, to the failure condition;
responsive to querying the database to identify the failure symptom in the historical data, identifying troubleshooting options in the historical data that are assigned to the failure symptom, wherein the troubleshooting options are included in the historical data due to the troubleshooting options being previously undertaken to mitigate the failure symptom;
responsive to identifying the troubleshooting options, obtaining probabilities that the troubleshooting options, when undertaken with respect to the device, will mitigate the failure symptom; and
responsive to obtaining the probabilities, causing the troubleshooting options and the probabilities to be presented on a display to a data center technician.

11. The method of claim 10, wherein the probabilities are obtained based upon a number of times that the troubleshooting options were indicated as being taken in the historical data and a number of times that the troubleshooting options were indicated as successfully resolving the failure symptom.

12. The method of claim 10, wherein the troubleshooting options comprise a first troubleshooting option and a second troubleshooting option, wherein the first troubleshooting option has a first probability that the first troubleshooting option will mitigate the failure symptom when undertaken to mitigate the failure in the data center, wherein the second troubleshooting option has a second probability that the second troubleshooting option will mitigate the failure symptom when undertaken in the data center, wherein the first troubleshooting option and the second troubleshooting option are presented on the display as an ordered list, wherein an ordering of the first troubleshooting option and the second troubleshooting in the ordered list is based upon the first probability and the second probability.

13. The method of claim 10, further comprising:
determining identities of devices that are adjacent to the device in a network graph for the data center; and
causing the identities of the devices to be presented on the display.

14. The method of claim 10, further comprising:
receiving a selection of a troubleshooting option from the troubleshooting options; and
responsive to receiving the selection of the troubleshooting option, causing a debugging step to be presented on the display, the debugging step comprising an instruction for resolving the failure in the data center.

15. The method of claim 10, further comprising:
determining a location of the device within the data center based upon the alarm; and
causing the location of the device within the data center to be presented on the display.

16. The method of claim 10, wherein causing the troubleshooting options and the probabilities to be presented on the display comprises:
transmitting, over a second network connection, the troubleshooting options and the probabilities to a computing device operated by the data center technician, wherein troubleshooting options and the probabilities are presented on the display.

17. The method of claim 10, wherein the device is one of a switch, a router, a re-router, a gateway, a hub, or a bridge.

18. The method of claim 10, further comprising:
receiving feedback from the data center technician that the failure symptom has been mitigated and that a troubleshooting option in the troubleshooting options was employed to mitigate the failure symptom; and
updating the historical data based upon the feedback.

19. The method of claim 10, wherein the historical data further comprises characteristics of the device, the characteristics comprising at least one of: an identifier for the device, a type of the device, a model of the device, an identity of the data center that includes the device, logs of hardware changes to the device, or logs of software changes to the device, the acts further comprising:
causing the characteristics of the device to be presented on the display.

20. A computer-readable storage medium comprising instructions that, when executed by a processor of a resolution system, cause the processor to perform acts comprising:
receiving, over a network connection, an alarm generated by a device in a data center, the alarm comprising a failure condition that is indicative of a failure in the data center;
responsive to receiving the alarm, querying a database comprising historical data to identify a failure symptom that is mapped to the failure condition;
responsive to identifying the failure symptom in the historical data, identifying troubleshooting options in the historical data, the troubleshooting options are included in the historical data due to data center technicians previously employing the troubleshooting options in attempts to mitigate failures associated with the failure symptom;
causing the troubleshooting options to be presented to a data center technician on a display responsive to identifying the troubleshooting options;

subsequent to outputting the troubleshooting options, receiving feedback from the data center technician that the failure symptom has been mitigated and that a troubleshooting option in the troubleshooting options was employed to mitigate the failure symptom; and
updating the historical data based upon the feedback.

\* \* \* \* \*